Oct. 27, 1970  D. F. WINTER  3,535,907
PRESS AND METHODS FOR FORMING MAGNETIC CORES
Filed July 13, 1967  7 Sheets-Sheet 1

David F. Winter,
Inventor.
Koenig, Senniger, Powers and Leavitt,
Attorneys.

Oct. 27, 1970   D. F. WINTER   3,535,907
PRESS AND METHODS FOR FORMING MAGNETIC CORES
Filed July 13, 1967   7 Sheets-Sheet 2

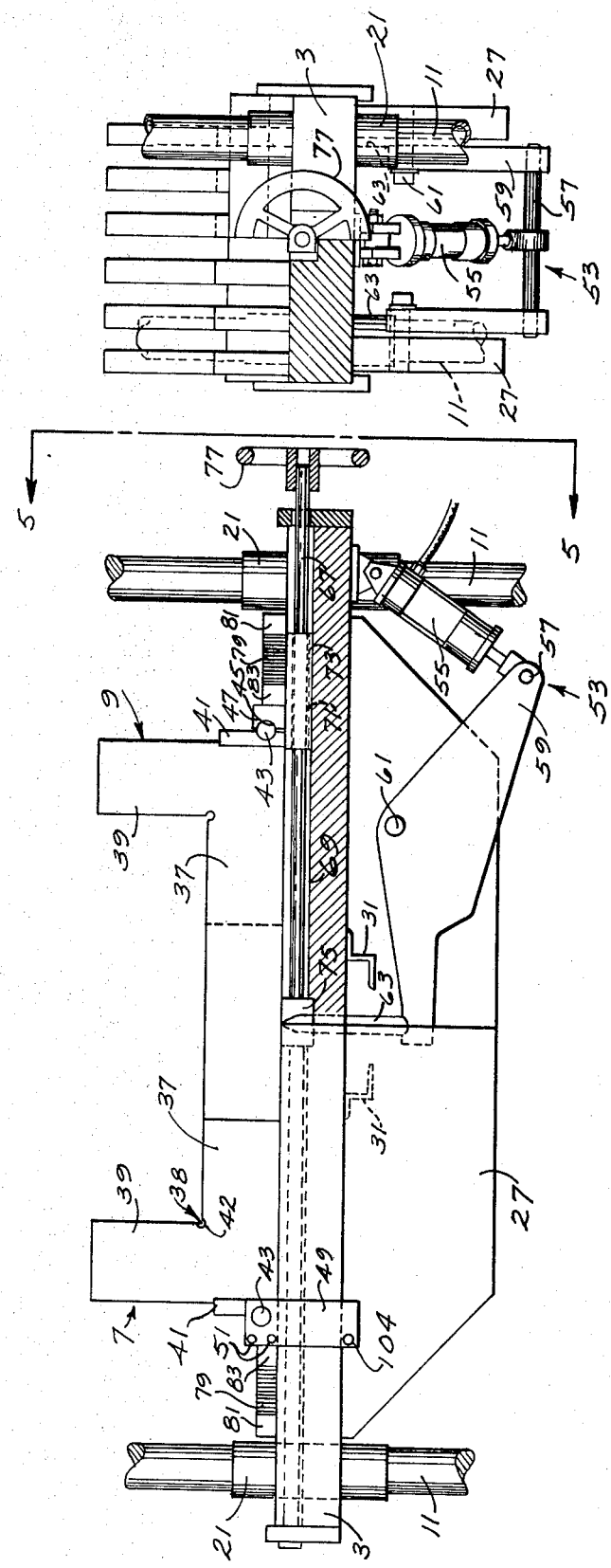

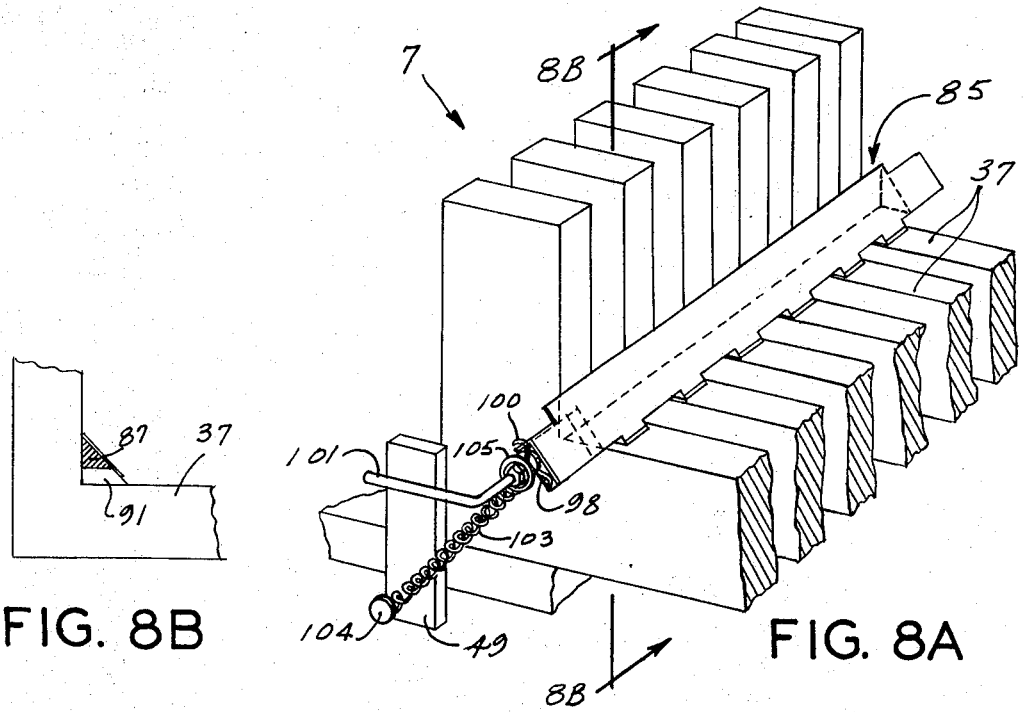
FIG. 8B
FIG. 8A
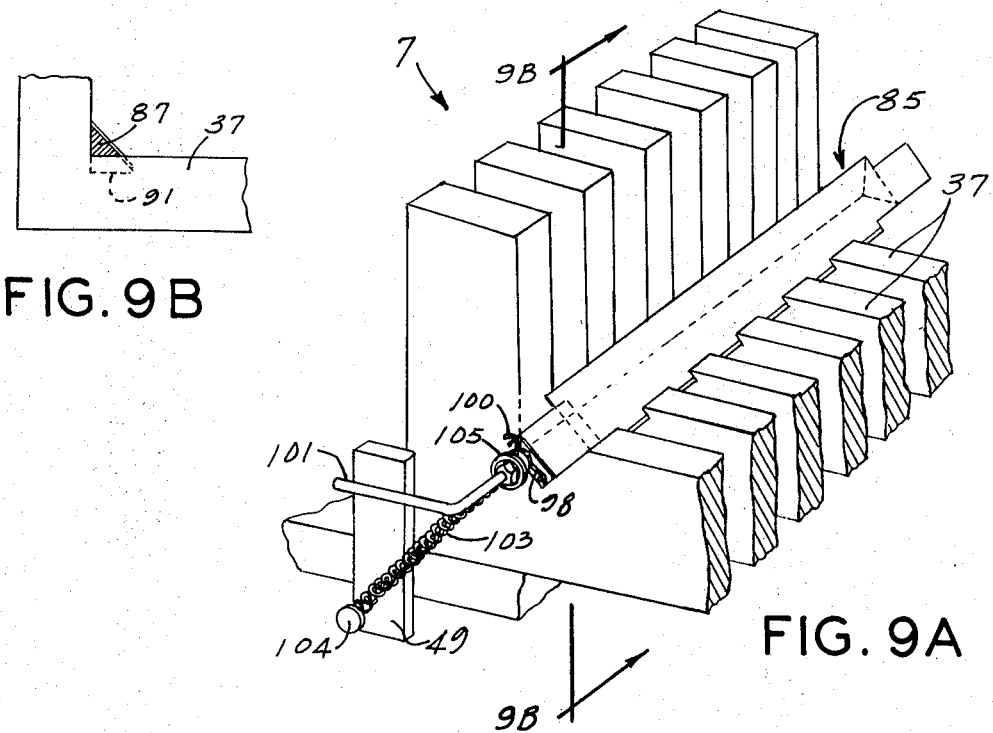
FIG. 9B
FIG. 9A

United States Patent Office 3,535,907
Patented Oct. 27, 1970

3,535,907
PRESS AND METHODS FOR FORMING MAGNETIC CORES
David F. Winter, Kirkwood, Mo., assignor, by mesne assignments, to Central Transformer, Inc., Pine Bluff, Ark., a corporation of Arkansas
Filed July 13, 1967, Ser. No. 653,216
Int. Cl. B21d 22/00
U.S. Cl. 72—353                             19 Claims

ABSTRACT OF THE DISCLOSURE

Hydraulic press aparatus and methods for die-forming magnetic cores from a wound circular configuration to a generally rectangular configuration are described. The press is constituted by a pair of opposed relatively movable platens, each having a pair of L-shaped die bar assemblies pivotally mounted thereon and arranged so that the horizontal legs of the bars on each platen are interdigitatable and the vertical legs of the bars on one of the platens are interdigitatable with the vertical legs of the bars on the other platen, the L bars being arranged on their respective platens so as to define an open rectangle. A corner block of chevron, curved or triangular cross-section is optionally removably mounted in the inner apices of the L bars for shaping the outside corners of the cores during the pressing operation, and a rectangular window block is insertable into and extractable from the center opening of the core by a transverse hydraulic ram thereby to form a generally rectangular core window. To form a transformer core, a circular wound loop of magnetizable material is inserted in the press between the pairs of opposed L bars with the desired corner blocks and window form, and the lower platen is advanced toward the upper platen. The core yokes are restrained by the vertical L bar legs to a dimension corresponding to the overall desired core length and the width of the core is determined by the core build and the width dimension of the window form. As the core is pressed, the magnetic strip is forced to assume the desired configuration in accordance with the size and configuration of the corner blocks and window form. The corner blocks may then be partially or completely removed from the corner areas, the window form reduced in thickness and the core again pressed to overbend the core yokes and sharply bend the core corners.

Background of the invention

This invention pertains to a press and methods for forming magnetic cores, and particularly to a hydraulic press for die-forming wound type transformer cores.

Transformer cores, and particularly cores for distribution transformers, are typically constructed by winding either a continuous web of magnetizable material or a series of individual strip segments about a circular mandrel. If the core is wound from a continuous web or strip of material, it is severed at one or more spaced locations around the core and the ends of the laminations are arranged in stepped relationship so that the core may be opened after die-forming for lacing through a preformed coil unit. In cores formed of a series of individual strip segments, the sements are concentrically or spirally wound about the cylindrical mandrel in a plurality of groups or packets such that the ends of successive segments in each packet are offset from each other, thereby providing a series of openable joints through the core build and permitting the core to be opened for lacing through the preformed coil unit. After winding, the cores are die-formed in a suitable press to a generally rectangular configuration, and then annealed in a furnace at a predetermined temperature for a predetermined period of time to relieve the stresses set up in the lamination during the winding and pressing operations. The core are then opened at their joints or series of joints for assembly with preformed coil units.

The purpose of the die-forming or pressing operation is to shape the core from its generally as wound circular configuration to a generally rectangular or toroidal configuration having a pair of leg portions and a pair of yoke portions defining an open center window. To press the core, various types of hydraulic presses ranging from only a few to fifty or one hundred tons have been utilized for forming various sizes and types of cores. One of such presses, for example, is constituted by a flat bed or table upon which are fixedly mounted a stop block and three hydraulic rams. The stop block and one of the hydraulic rams are spaced apart with their longitudinal axes in alignment, and the remaining two hydraulic rams are aligned along an axis perpendicular to the axis of the first cylinder and stop block, thereby defining a generally rectangular opening between four forming plates affixed to the ends of the stop block and rams. To die-form a core in the type of press, a circular wound core is disposed in the rectangular opening between the four forming plates and the hydraulic rams are then operated either simultaneously or successively to press the core to a rectangular configuration, after which the hydraulic rams are withdrawn and the core removed from the press. After removal, the core is restrained by a plurality of band straps or plates secured together around the periphery of the core by tie bars so as to prevent the core from bowing or "ballooning" outwardly prior to and during the annealing operation.

Such presses are inherently limited with respect to the types and sizes of cores which they are capable of pressing, and particularly with respect to the shaping of the core and its corners. That is, such presses are not capable of shaping the core corners so as to provide one or more bend lines extending from the core window substantially through the core build, or of overbending the core leg or yoke portions so as to inwardly deflect the same. It is known that cores having bend lines in their corners and overbent leg or yoke portions have substantially less tendency to balloon outwardly during annealing, with the result that they maintain their overall dimensional stability and rectangular configuration to a substanially greater extent than conventional round-cornered straight-sided cores. Although other presses have been developed which utilize arcuate die faces for overbending the core legs and for providing bend lines in the core corners, such presses are not satisfactory in a number of respects. For example, each such press is capable of producing but a single or a limited number of different core sizes. Thus, to press, for example, cores for use in 5 kva. to 167 kva. transformers may require up to forty-six separate presses each having a specifically configured pair of die faces.

Summary of the invention

Accordingly, among the several objects of the present invention may be noted the provision of an extremely versatile press and method for die-forming transformer cores from a circular wound configuration to a generally rectangular configuration; the provision of such a press in which a variety of core sizes and configurations may be pressed; the provision of such a press in which the core corners may be accurately formed with one or more lines of bend therein; the provision of such a press in which the yoke and/or leg portions of the core may be overbent a predetermined amount; the provisions of such a press in which the core corner forming portions may be readily altered; the provision of such a press in which a window forming block may be readily inserted into and removed from a core to be pressed; and the provision of such a press which automatically centers a core prior to its being formed. In addition, the press of this invention is characterized by simplicity of construction, low cost and ease of operation and use. Other objects and features will be in part apparent and in part pointed out hereinafter.

Briefly, a press of this invention for forming transformer cores having a generally rectangular configuration from wound cores having a generally circular configuration includes a pair of relatively movable opposed platens, each carrying first and second die assemblies. Each of the die assemblies is comprised of at least one generally L-shaped bar, and means are provided for moving the platens toward and away from one another. The method of forming cores of this invention comprises the steps of forming an annular core including a plurality of turns of magnetizable strip material and inserting the annular core in a press having a pair of opposed relatively movable platens, each carrying first and second spaced die assemblies comprising a plurality of interdigitatable L bars having first and second legs defining a rectangular opening. The core is pressed into a generally rectangular configuration by moving one of the platens toward the other while restraining the core at its ends to an external overall dimension substantially corresponding to the desired length of the core, the restraint being provided by the interdigitated second legs of the L bars, the spacing of which is fixed throughout the pressing operation. The core is then removed from the press and annealed to relieve stresses set up in the winding and pressing operations.

Brief description of the drawings

FIG. 4 is a section taken on line 4—4 of FIG. 3;

FIG. 5 is an end view taken on line 5—5 of FIG. 4;

FIG. 8A is a partial perspective view of a die bar assembly showing a first position of the corner block of FIG. 6;

FIG. 8B is a section taken on line 8B—8B of FIG. 8A;

FIG. 9A is a partial perspective view similar to FIG. 8A but showing a moved position of the corner block;

FIG. 9B is a section taken on line 9B—9B of FIG. 9A;

Corresponding reference characters indicate corresponding parts throughout the several views of the drawings.

Description of the preferred embodiments

Figure 1:
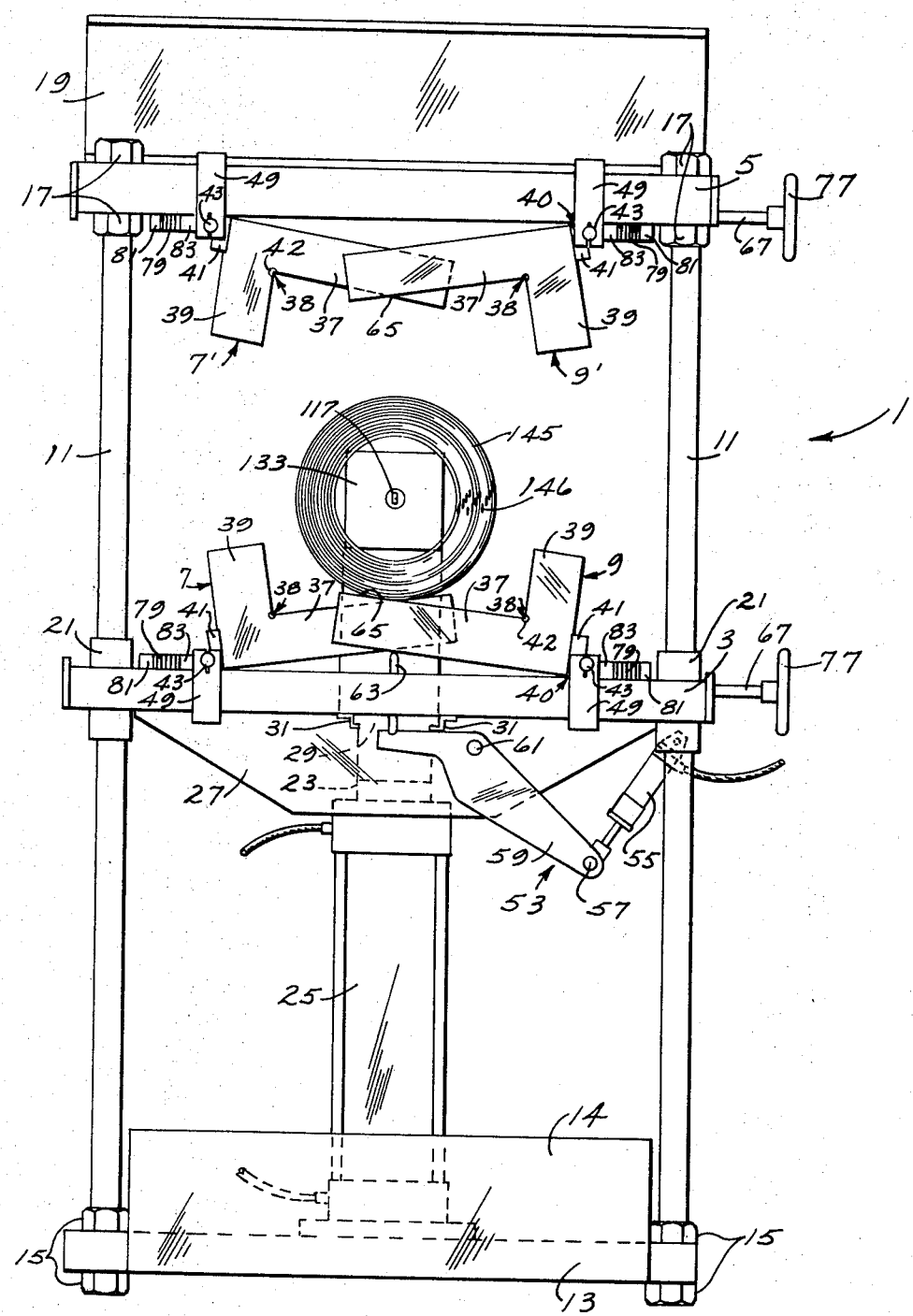
FIG. 1 is a front elevation of the press of this invention.

Referring now to the drawings, and particularly to FIGS. 1–5, a press of this invention for die-forming wound transformer cores is indicated generally at 1. The press is constituted by a pair of relatively movable opposed parallel platens 3 and 5, each carrying first and second die assemblies 7, 9 and 7', 9', respectively. The platens 3 and 5 are carried on four supports or guide posts 11 each secured at their lower ends to a base plate 13 by a pair of nuts 15 threaded on the posts on opposite sides of the plate 13. The plate 13 is reinforced by a pair of gussets 14 and is suitably affixed to and supported in the floor of a building where the press is to be utilized. The upper platen 5 is similarly secured to the posts 11 by pairs of nuts 17 on opposite sides of the platen, and an I-beam 19 is affixed to the top of the platen 5 for rigidizing the entire assembly. Lower platen 3 is slidably received on posts 11 by means of four cylindrical sleeves 21, and is supported in its lowermost or retracted position (FIG. 1) by a ram 23 of a double-acting hydraulic motor 25 of the piston-cylinder type, the lower end of which is mounted on base plate 13. The ram 23 is flanged at its head end 29 for engagement with a pair of Z-shaped angle bars 31 secured to the lower face of platen 3 between a pair of reinforcing gussets 27. Thus, hydraulic motor 25 constitutes a means for moving the platens, actuation of which by means of a suitable hydraulic pump and control circuit (not shown) causes ram 23 and lower platen 3 to move upwardly or downwardly on guide posts 11 relative to fixed upper platen 5. Motor 25 typically has approximately a 50 ton capacity.

Figure 2:
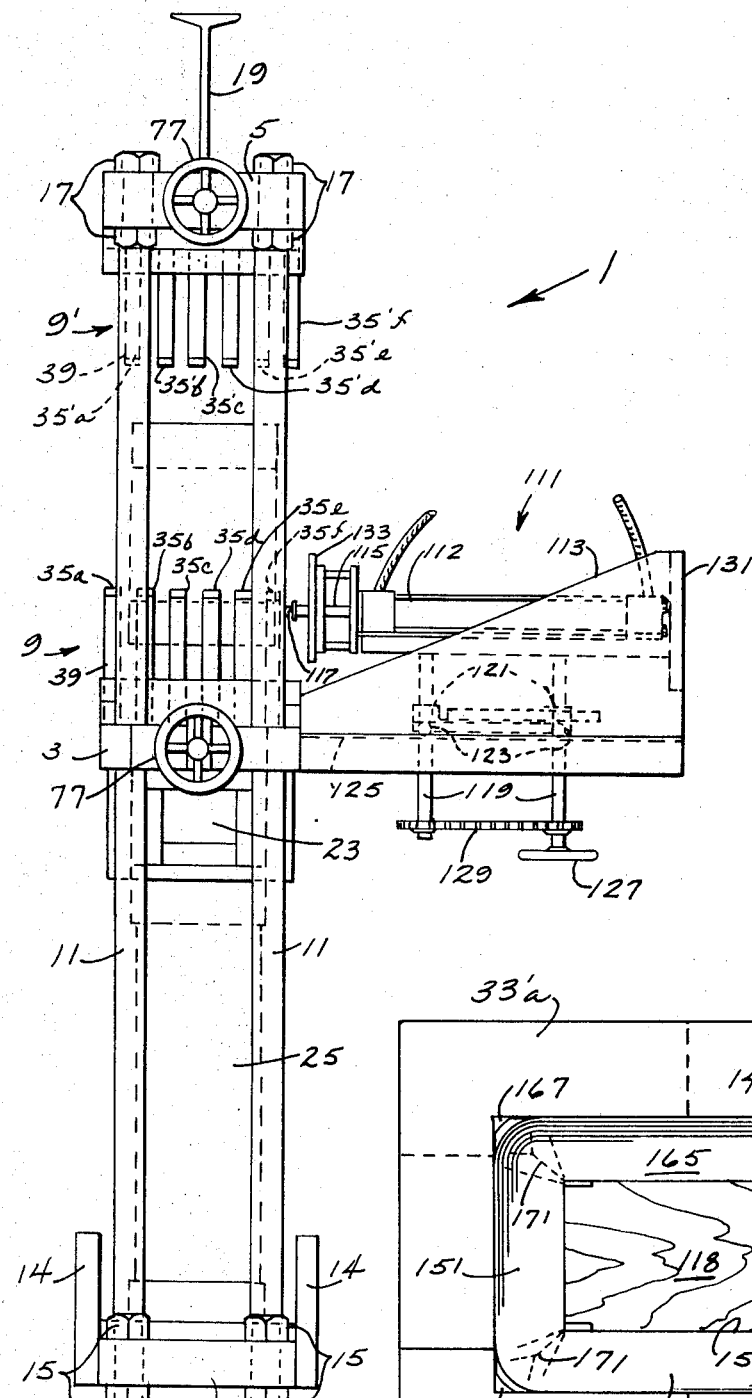
FIG. 2 is a side elevation of the press.
Figure 3:
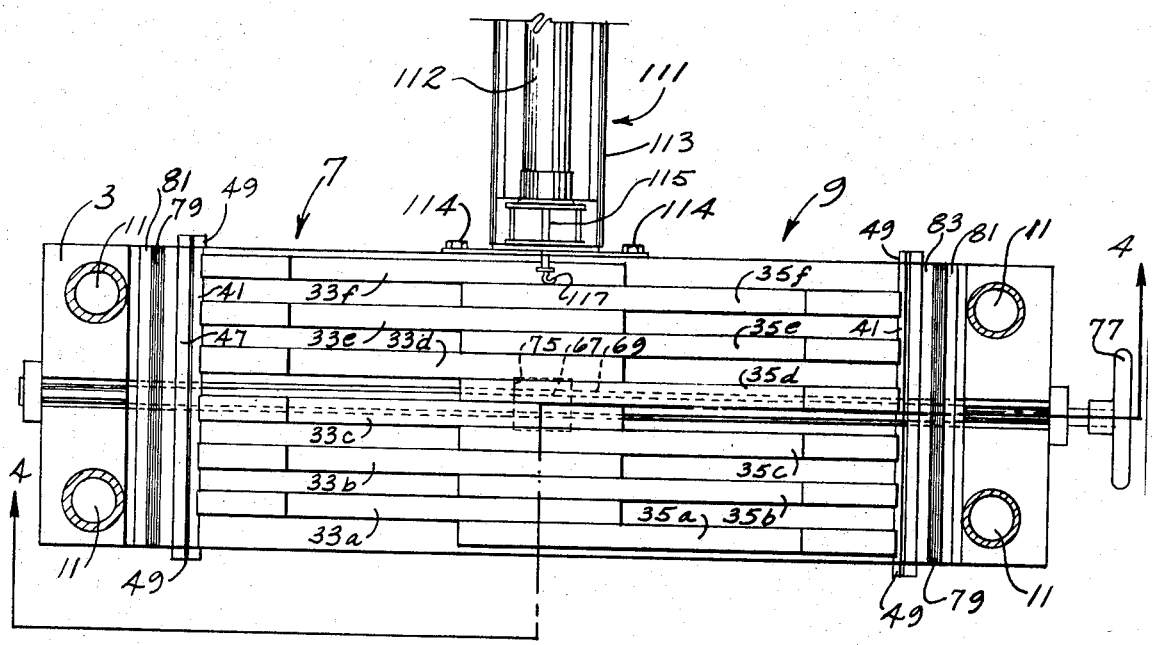
FIG. 3 is a plan view of the lower platen of the press.

As best illustrated in FIGS. 2 and 3, each of the first and second die assemblies 7, 9 and 7', 9' is constituted by a set of six generally L-shaped steel bars. The L bars comprising the first L bar assembly 7 on movable platen 3 are indicated by reference numerals 33a, b, c, d, e, and f and the L bars comprising the second L bar assembly 9 on lower platen 3 are indicated by reference numerals 35, b, c, d, e and f. Similarly, the L bars comprising the first L bar assembly 7' on upper fixed platen 5 are indicated by reference numerals 33'a, b, c, d, e and f and the L bars comprising the second L bar assembly 9' on platen 5 are designated by reference numerals 35'a, b, c, d, e and f. Each of the L bars is formed of flat stock having first and second mutually perpendicular legs 37 and 39, respectively positionable parallel and normal to the plates, defining an inner apex 38 and an outer apex 40, the inner apex being stress relieved by a circular notch 42 (see FIG. 4). The four L bar assemblies are disposed on their respective platens such that the inner apices 38 define the four corners of an open rectangle.

The first legs 37 of first and second L bar assemblies 7, 9 and 7', 9' and the second legs 39 of the first L bar assemblies 7 and 7' and the second L bar assemblies 9 and 9' are interdigitatable. That is, as best illustrated in FIGS. 2 and 3, first legs 37 of L bars 33a–f are offset or shifted transversely across the plane of platen 3 from first legs 37 of L bars 35a–f so that the ends of the first legs of L bar assemblies 7 and 9 interdigitate or interleave with each other. The legs 33'a–f and 35'a–f of L bar assemblies 7' and 9' on upper fixed platen 5 are similarly offset so that the ends thereof also interdigitate. In addition, the second legs 39 of L bars 35a–f on platen 3 are offset from the second legs 39 of L bars 35'a–f on platen 5 so that the ends of the second legs of L bar assembly 9 inter-digitate with the ends of the second legs of L bar assembly 9' when movable platen 3 is advanced upwardly towards fixed platen 5. In a similar manner, the ends of the second legs 39 of L bar assemblies 7 and 7' interdigitate. The first legs 37 of the L bars are provided with removable extensions (not shown) for permitting the L bars to interdigitate when pressing large cores. The L bars of each of the L bar assemblies are secured together in spaced side-by-side relationship by a transversely extending backing plate 41 having a plurality of spaced notches receiving the rear lower edges of the second legs 39. Suitable fastening means, such as pins or threaded fasteners, secure the backing plates 41 to each of the L bars.

As illustrated in FIGS. 1 and 4, each of the L bar assemblies is pivotally mounted on its respective platen for movement about a respective axis parallel to the platens from a first inclined position wherein first legs 37 of assemblies 7, 9 and 7' 9' define an acute angle with their respective platens 3 and 5 (FIG. 1) to a second substantially horizontal position wherein first legs 37 are parallel to their platens (FIG. 4). To accomplish this, backing plate 41 is fixedly secured to a shaft 43 pivotally mounted in a semicircular recess 45 formed in a bearing block 47 (see FIG. 4). A pair of end plates 49, secured to block 47 by fasteners 51, rotatably receive and support the ends of the shaft 43. Thus, L bar assemblies 7, 9 and 7', 9', backing plates 41 and shafts 43 are pivotal in bearing block 47, and are held in pivotal contacting relationship therewith by the end plates 49. In the position of the L bar assemblies illustrated in FIG. 1, upper assemblies 7' and 9' pivot downwardly about their respective shafts 43 under the influence of gravity. Lower L bar assemblies 7 and 9, however, are pivoted upwardly by means of a hydraulic motor and crank assembly indicated generally at 53.

Referring to FIGS. 1, 4 and 5, the assembly 53 constitutes a means for pivoting the L bars and includes a hydraulic motor 55 connected at its ram end to a transverse shaft 57, the latter being secured to a pair of bell cranks 59 pivotally mounted on stub shafts 61 secured to platen gussets 27. Each of the bell cranks 59 carries a push rod 63 at its end opposite shaft 57, which rods pass through a pair of apertures in platen 3 and engage the lower faces of L bars 33a, 35b and 33e, 35f at legs 37. Thus, actuation of motor 55 causes bell cranks 59 to pivot about shafts 61 in a clockwise direction, thereby driving push rods 63 upwardly through the apertures in platen 3 and pivoting die bar assemblies 7 and 9 about shafts 43. In their pivoted positions, the ends of the interdigitated first legs of the L bars define a shallow V-shaped recess 65, the purpose of which will be hereinafter set forth.

L bar assemblies 7, 9 and 7', 9' are movable horizontally over their respective platens so that the distance between second leg portions 39 of the L bar assemblies on each platen may be varied to press cores of different lengths. Specifically, means for moving the L bars toward and away from each other comprises a double oppositely threaded shaft 67 carried in a longitudinal bore 69 in each of platens 3 and 5. The shaft 67 is threaded over portions of its length, as indicated at 71, for threaded engagement with a pair of internally threaded collars 73, the latter being secured by suitable fasteners to bearing blocks 47 for conjoint movement. A center retainer 75 having a pair of shaft retainer rings at its ends (not shown) is secured to the center of each of platens 3 and 5 for restraining shafts 67 against linear movement. The left threaded portion of the shaft, as viewed in FIG. 4, is provided, for example, with a left-hand thread and the right portion of the shaft with a right-hand thread. A hand wheel 77 is affixed to the end of the shafts adjacent one end of each of the platens. Thus, rotation of the hand wheels 77 causes shafts 67 to rotate, thereby effecting linear movement of threaded collars 73 toward or away from each other, depending upon the direction of rotation of the hand wheels. As collars 73 move toward or away from each other, blocks 47, shafts 43, plates 41 and L bar assemblies 7, 9 and 7', 9' move in unison toward or away from each other over the surface of their respective platens. When the assemblies are adjusted to their desired positions, a plurality of shims 79 are inserted between a pair of elongate blocks 81 and 83, the blocks 81 being secured to the top of each of the platens adjacent sleeves 21 and the blocks 83 being secured to bearing block 47 for movement therewith. After shims 79 are inserted between blocks 81 and 83, handle 77 is rotated slightly in a direction opposite to its initial rotation so that the load exerted on the L bars during the pressing operation is transmitted through blocks 81 to the platens, rather than to shafts 67.

As set forth above, transformer cores tend to return to their wound circular configuration after pressing so as to assume a generally oval configuration rather than the well defined rectangular configuration formed during the pressing operation. Devices such as band straps and external clamping arrangements have been utilized in the past for preventing this from occurring, but frequently these band straps or forms fail under the extreme loads exerted by the outwardly deflecting core. Thus, such cores cannot be held to desired tolerances which result in a large number of rejects, and the windows are distored which increases the difficulty of assembling the cores with preformed coils. To overcome this problem, the press of this invention shapes the corners of the core during the pressing operation such that one or more lines of bend extend at least partially through the core build, and overbends the core yokes such that the yokes bow inwardly. The lines of bend in the core corners prevent relative shifting movement of the core laminations, and the overbend core yokes overcompensate for the tendency of the core to bow outwardly.

Figures 6, 7:
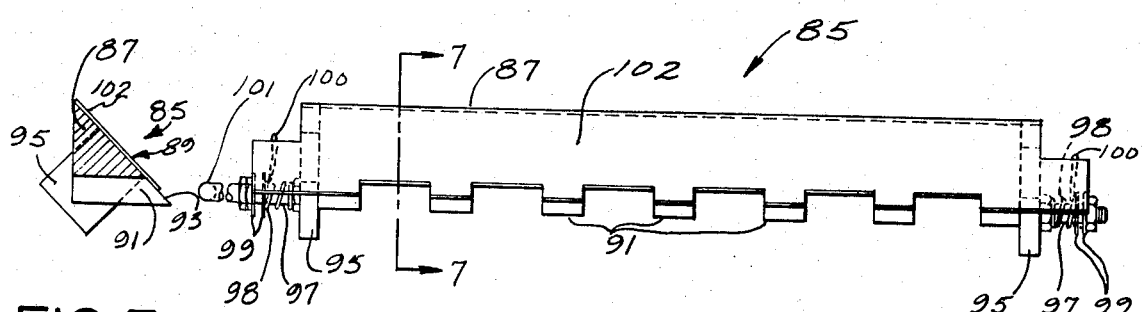
FIG. 6 is a front elevation of a first corner block for use with the press of FIG. 1.
FIG. 7 is a section taken on line 7—7 of FIG. 6.

To accurately shape the core corners, a corner block is mounted in each of the inner apices 38 of L bar assemblies 7, 9 and 7', 9'. One form of the corner block is indicated at 85 in FIGS. 6 and 7 as being constituted by an elongate bar of triangular cross-section. A main triangular body portion 87 extends from one end of the corner block 85 to the other providing an upper inclined core engaging surface 89. A plurality of equally spaced projections 91 extend from the base surface of the body portion 87 at intervals along its length providing an inclined core engaging surface 93 forming a continuation of the main core engaging surface 89. Secured to the ends of corner block 85 are generally rectangular end plates 95 carrying shafts 97, each of which has a pair of spaced washers 99 secured near its ends. A handle 101 is provided on shaft 97 at one end of the corner block 85, and a shim 102, of brass or the like, is slidably mounted over surfaces 89 and 93 and is biased upwardly away from surfaces 93 by springs 98 coiled about shafts 97 and attached to the shims at 100.

Referring to FIG. 8A, the corner block 85 is movably mounted in the inner apices of each of the L bar assemblies by a pair of springs 103 fixed at one end to a stud 104 on end plates 49 and at the other end to corner block 85 by a ring 105 encircling shaft 97 between washers 99. Blocks 85 may thus be mounted in or removed from the inner apices of the L bar assemblies by simply inserting or removing the rings 105 from between the washers 99.

To obtain certain core corner configurations, two pressing operations may be performed rather than one. In such cases, and as will be set forth more fully hereinafter, the corner blocks are partially or completely removed from the corner areas between the first and second pressing operations. Thus, for the first pressing operation corner blocks 85 are mounted in the inner apices of the L bar assemblies. That is, projecting portions 91 extending from the lower surface of triangular body portion 87 are seated on legs 37 of the L bars in each of the L bar assemblies, thereby supporting corner block 85 for maximum exposure in the corner area, as illustrated in FIGS. 8A and 8B. After the first pressing operation is completed but before the second pressing operation is commenced, corner blocks 85 are partially removed from the corner area by sliding corner blocks 85 transversely over the L bars until projections 91 are disposed in the spaces between adjacent L bars. In this position, the vertical component of force exerted by springs 103 causes the lower surface of triangular body portion 87 of the corner block to seat against L bar legs 37. The core engaging surface 89 is thus lowered out, or at least partially out, of the corner area to the FIGS. 9A and 9B position. The extent to which blocks 85 project into the corner areas during the second pressing operation may be varied by varying the relative thicknesses of portions 87 and 91. Blocks 85 are returned to their initial FIG. 8A and 8B positions after the second pressing by rotating the blocks 90°, sliding them transversely on shims 102, and then rotating them until projecting portions 91 are seated on L bar legs 37. To prevent snagging as the blocks are rotated, notches 42 in outer L bars 33a and f, 35a and f, 33'a and f and 35'a and f are filled with a solid rod. As set forth above, corner blocks 85 may be completely removed from the press by merely removing rings 105 from between washers 99 on both sides of each of the blocks.

Figure 10:
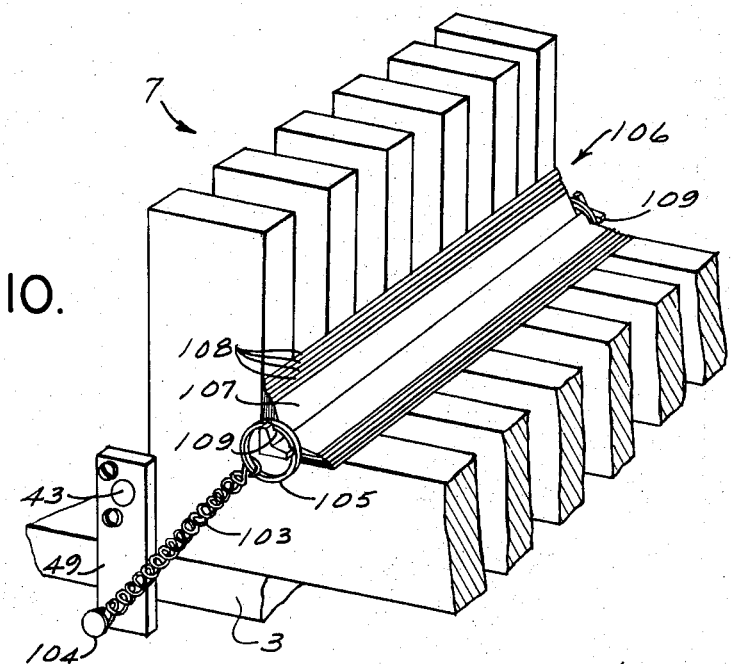
FIG. 10 is a perspective view similar to FIG. 8A showing an alternate corner block.
Figure 11:
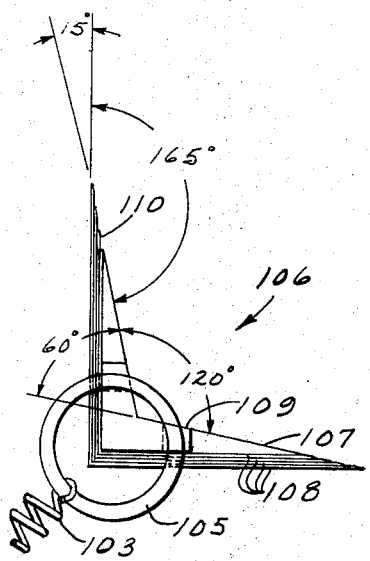
FIG. 11 is an end view of the corner block of FIG. 10.

An alternative corner block 106 for die-forming a core having a single line of bends in each corner is illustrated in FIGS. 10 and 11. The block 106 is of shallow V-shaped or chevron cross-section and is constituted by a first elongate bar 107 and a plurality of elongate complementary shims 108. The ends of the bar 107 are notched, as indicated at 109, for receiving rings 105 of springs 103 to hold the blocks in the inner apices of the L bar assemblies. The longitudinal edges 110 of bar 107 and shims 108 are arranged in stepped relationship and are rounded so as to form a smooth transition from corner block 106 to the vertical and horizontal legs of the L bars. Shims 108 are provided for permitting the blocks to be used with cores of different sizes. That is, for the smallest core to be pressed with the blocks only inner bar 107 is utilized. For pressing larger cores, however, one or more shims 108 is interposed between bar 107 and the L bar assemblies so as to increase the corner area occupied by the block.

The exact configuration of block 106 may, of course, vary in accordance with the desired configuration of the core corner. For pressing a preferred core corner, however, block 106 is configured so as to produce a single line of bends extending from each of the corners of the core window completely through the core build to the outer lamination thereof. The core laminations are permanently deformed only along this line by providing a bending angle at the apice of block 106 which bends the core laminations past their elastic limit during the pressing operation. For magnetizable sheet steel of the type typically utilized for winding transformer cores, it has been determined that the elastic limit of such sheet or strip steel is reached if the bend angle exceeds approximately 25°. This, of course, depends upon the bending radius and the thickness of the material, but for materials and bending radii generally utilized in winding such cores this angle is approximately correct. Therefore, corner block 106 (see FIG. 11) described a center included angle of approximately 120° and a pair of edge angles of 15° to form the core with approximately 120° included angles at its apices and approximately 165° included angles at each of the adjacent yoke and leg portions. The 60° bend at the apex of each corner exceeds the elastic limit of the laminations and permanently deforms the same to provide a sharply defined line of bends therein, while the 15° bends on either side of the apex along the adjacent core leg and yoke do not exceed the elastic limit of the laminations and hence they unbend after pressing to form a smooth curvilinear transition.

During the pressing operation or operations, a center rectangular window block 118 and one or more shims 120 (see FIG. 14A) are inserted in the core window to sharply define the corners thereof and assure a rectangular opening for assembly with the preformed coil unit. Similarly, prior to the annealing operation another center block is inserted in the core window to prevent distortion of the inner turns of the core during annealing. To assist in inserting and removing either or both of these blocks prior and subsequent to the pressing operations, a transversely mounted hydraulic ram or motor 111 is secured to the rear of movable platen 3, which motor constitutes means for inserting and/or removing the block from the window. As best illustrated in FIGS. 2 and 3, the hydraulic motor 111 comprises a double-acting hydraulic cylinder 112 mounted on a frame 113 secured to the center of movable platen 3 by fasteners 114. The ram end of the motor is provided with a piston rod 115 having an end portion 117 for engaging the rear of window block 118. The hydraulic cylinder 112 is mounted on the frame 113 for front-to-back horizontal movement and up and down vertical movement by means of a pair of threaded shafts 119 carried by a pair of internally threaded collars 121, the latter having rollers 123 mounted thereon for movement on a pair of tracks 125 on frame 113. A hand wheel 127 is fixed to one of the shafts and a drive chain 129 interconnects the shafts for simultaneous rotation upon operation of the hand wheel. Thus, to vertically center hook 117 in the window of a given core, hand wheel 127 is rotated to rotate both of the threaded shafts 119 in their fixed collars 121, thereby causing the motor to move upwardly or downwardly depending upon the direction of rotation of wheel 127. The motor is also movable horizontally over the tracks 125 but is restrained at the end of the tracks from rearward movement by an upright panel 131 on frame 113 and from forward movement by a backing plate 133 secured to the ram end of the cylinder. Thus, when drawing a center block 118 into the core window the plate 133 abuts the back of the core, and when pushing a center block from the core window the rear end of hydraulic cylinder 112 abuts the upright 131.

The operation of the press and methods of this invention are as follows. A strip of grain oriented magnetic material is circularly wound to form a generally annular loop, as indicated at 145 in FIG. 1. The loop is provided with an openable joint or series of joints 146 for lacing about a preformed coil unit by either winding the core of a continuous web and severing it after it has been wound, or by winding the core of individual strip segments arranged in a plurality of concentric openable packets. The press is then set up for die-forming the circular wound wore by adjusting the separation between vertical legs 39 of the L bar assemblies on each platen and by attaching the proper corner blocks, if any. The separation between legs 39 is adjusted to substantially the desired overall length dimension of the core to be pressed by rotating hand wheels 77 on platens 3 and 5 so as to move the L bar assemblies closer to or further from each other. As the hand wheels are rotated, threaded shafts 67 rotate in bores 69 in each platen thereby causing internally threaded collars 73 to move linearly in equal amounts toward or away from each other. Since bearing blocks 47 are rigidly affixed to collars 73 and backing plates 41 through end plates 49, the entire L bar assemblies are moved with the collars. When the correct spacing is obtained, a plurality of shims 79 are inserted between blocks 81 and 83 on each of the platens and hand wheels 77 are rotated slightly in a reverse direction to remove the load from the shafts and transmit it directly through the blocks and shims to the platens. By providing adjustable die bar assemblies and removable shims, the press is capable of die-forming all forty-six core sizes normally utilized in distribution transformers ranging from 5–167 kva. Such cores generally have lengths ranging from 8 to 26 inches and builds ranging from 1⅛ to 3 inches.

After adjusting L bar assemblies 7, 9 and 7', 9' on the platens 3 and 5, circular wound core 145 is placed in V-shaped recess 65 formed by the pivoted interdigitated ends of first legs 37 of L bar assemblies 7 and 9. Since the core is circular, the inclinations of legs 37 at recess 65 cause the core to center itself in the press between vertical legs 39, thus eliminating the necessity of manually manipulating the core to accomplish this. As set forth above, the interdigitated ends of L bar legs 37 on movable platen 3 are pivoted upwardly by assembly 53 to form recess 65. Thus, hydraulic motor 55 is operated through a suitable hydraulic circuit to pivot bell cranks 59 about shafts 61 and slide pins 63 upwardly through their respective apertures in platen 3. Since one of the pins engages the lower surface of leg 37 of L bars 33a and 35b, and the other pin engages the lower surface of leg 37 of L bars 33e and 35f, assembles 7 and 9 are pivoted about shafts 43 to their FIG. 1 inclined positions.

The hydraulic motor 25 is then operated to advance movable platen 3 upwardly towards fixed platen 5. When the top of core 145 engages V-shaped recess 65 formed by the interdigitated ends of legs 33' and 35' of L bar assembles 7' and 9', the core is also caused to assume a center position between vertical legs 39 on the upper platen 5. Advancement of movable platen 3 continues until the force exerted by hydraulic motor 25 on L bar assemblies 7, 9 and 7', 9' pivots them about their shafts 43 to the positions illustrated in FIG. 4 wherein leg portions 37 are parallel to their respective platens. That is, the force exerted by hydraulic motor 25 acting through core 145 opens an internal relief valve in motor 55 and permits L bar assemblies 7 and 9 to return from their V-shaped pivoted positions to their parallel positions over platen 3. Assemblies 7' and 9' are also pivoted against platen 5. As the die bar assemblies are pivoted flat against their respective platens, the circular wound core 145 begins to flatten and elongate horizontally and the window begins to assume a generally rectangular configuration. The hydraulic circuit to motor 25 is then interrupted to stop platen 3 in its partially advanced position and rectangular window block 118 is inserted in the core window through its open front. If necessary, the leading edges of block 118 are tapered to facilitate insertion in the core window, or the hook 117 on ram 111 is connected to a complimentary hook (not shown) on the back of the block to draw it into the window. Hydraulic motor 25 is then operated to again advance platen 3 toward platen 5 and complete the pressing operation. As platen 3 advances, vertical legs 39 of L bar assemblies 7 and 9 interdigitate with vertical legs 39 of L bar assemblies 7' and 9', respectively, and the core is pressed into the generally desired rectangular configuration. It should be noted that the interdigitated legs 39 restrain the core at its ends to an external overall dimension substantially corresponding to the desired length of the core, and the spacing between legs 39 remains fixed throughout the pressing operation.

Figure 12:
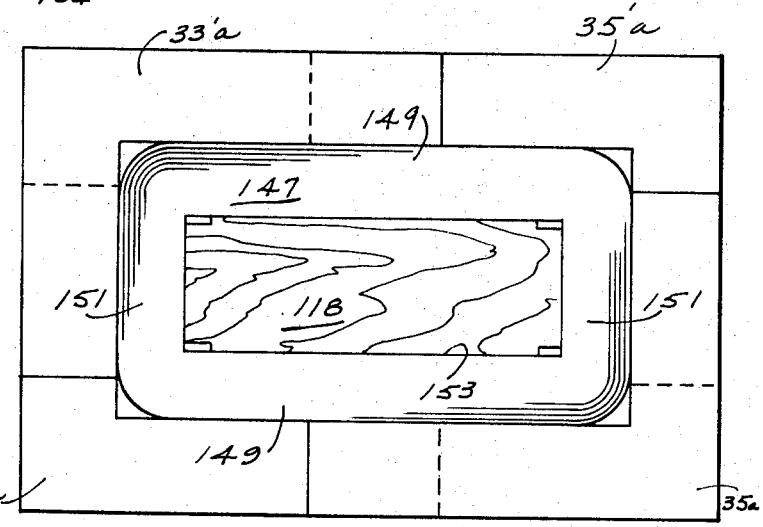

A core 147 is illustrated in FIG. 12 pressed between the interdigitated legs of the L bar assemblies. The core is constituted by leg portions 149, yoke portions 151 and a center window 153. This type of core is formed with the press of this invention in a single pressing operation and without the use of corner forming blocks. Thus, the corners of core 147 are rounded and the core laminations in the corner areas are not bent sharply enough to produce discernible lines of bend. Prior to removal of core 147 from the press, transverse hydraulic ram 111 is operated to advance rod 115 through core window 153 to push window block 118 out of the core. Rod 115 is then withdrawn from the core window and a center annealing form (not shown) is inserted. Hydraulic motor 25 is then operated in a reverse direction to lower platen 3 relative to platen 5 for removal of the core. When platen 3 reaches the end of its downward stroke, hydraulic motor 55 is operated to again pivot the interdigitated ends of the legs of L bar assemblies 7 and 9 upwardly, thereby freeing the the pressed core from between vertical legs 39 of the assemblies. The core is then easily removed from the press and placed on a suitable conveyor for removal to a banding station wherein a band strap is secured around the core to maintain the yoke and/or leg portions flat against the inner annealing form during the annealing operation. The core is next annealed in a suitable furnace at a predetermined temperature for a predetermined period of time to relieve the stresses set up in the core during the winding and pressing operations. After annealing, the cores are opened at their openable joints or series of joints for assembly with preformed coil units. The core and coil units are then mounted in suitable frames and tanks and are tested in a conventional manner.

Figure 13:
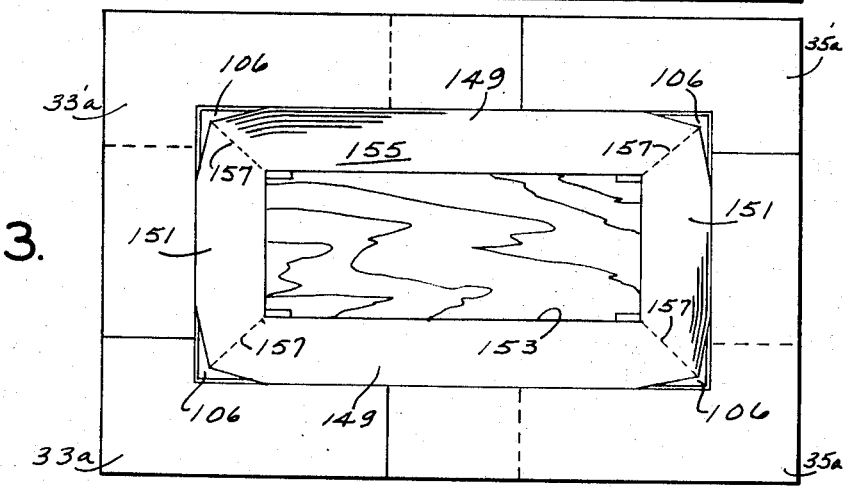

FIG. 13 illustrates a preferred core 155 pressed in a single pressing operation with the corner blocks 106 of FIGS. 10 and 11 disposed in the inner apices of the L bar assemblies. As set forth above, corner blocks 106 produce a single line of bends in each corner of the core extending from the window 153 completely through the build to the outer lamination of the core. Thus, each of the laminations has a single sharply defined bend 157 at each corner and a smooth rounded transition from the corner area to the adjacent core yoke and leg. This core has several unique advantages over core 147 illustrated in FIG. 12. For example, the line of bends 157 in each of the core corners securely locks all of the laminations together and substantially eliminates the tendency of the core to bow outwardly. Thus, only a single band strap need be secured around the core yokes to maintain the yokes flat against the window form during annealing, rather than the large outer form or heavy band straps heretofore required. That is, as the core legs relax against the inner form during annealing, the forces produced in the core legs tend to increase the bending angle at the core corners rather than to bow the core yokes outwardly since the yokes act as rigid columns when strapped to the inner annealing form. The area of least resistance to bending is the single line of bends in the corners, and the core gives at these points and increases the sharpness of the bends rather than bowing the core yokes outwardly and breaking the band straps. It should also be noted that the core window is held to assume a well defined rectangular configuration, thereby facilitating assembly with a preformed coil and increasing the magnetic efficiency of the core. If desired, the yokes 151 can be overbent in the manner to be set forth.

Figure 14A:
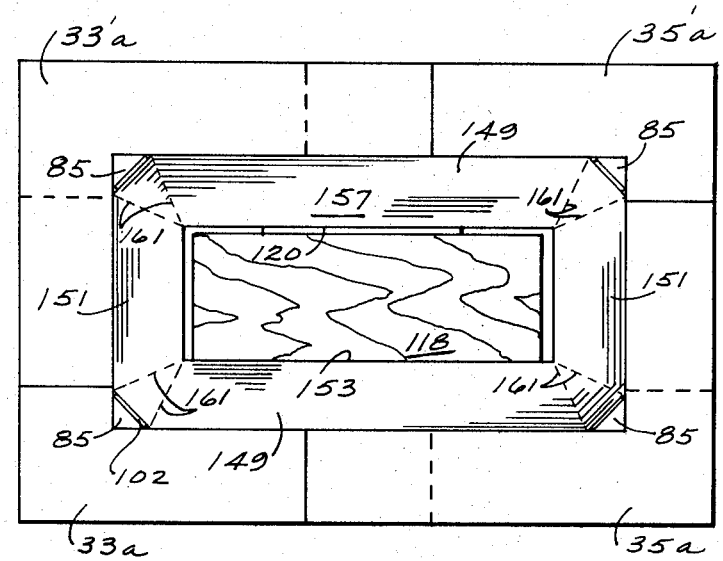
Figure 14B:
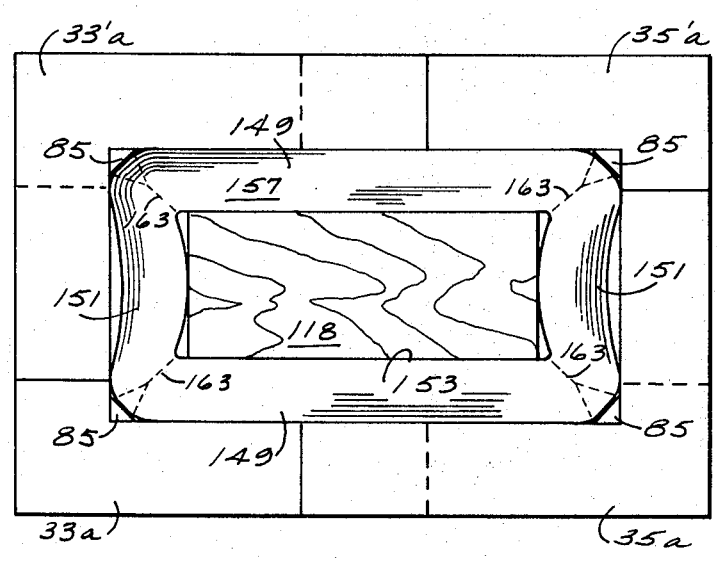

FIGS. 14A and 14B illustrate a two-step pressing operation utilizing the triangular cross-section corner blocks 85. In the first pressing operation illustrated in FIG. 14A, a core 157 is pressed with corner blocks 85 in the inner apices of the L bar assemblies and a shim 120 between one of the core legs 149 and the window block 118, the latter terminating short of the yokes 151. To reduce the friction between the core and blocks 85 during the pressing operation, shims 102 slide over surfaces 89 toward surfaces 93. Upon release of the core from the press, springs 98 return shims 102 to their initial positions. The core produced has a pair of bend lines 161 extending through the core build at each corner to define a pair of bends at the outer lamination. This core appreciably reduces the tendency of the core legs and yokes to bow outwardly after pressing but does not eliminate the problem altogether. However, by making a second pressing operation immediately following the first, this effect is further reduced. Thus, corner blocks 85 are partially or completely removed from the corner areas, center shim 120 is removed and the press is brought home against the smaller internal block. As noted in FIG. 14B, the second pressing operation overbends or inwardly bows yokes 151 of the core. When the core is removed from the press and annealed, the overbent yoke portions relax and assume a substantially straight and unbent configuration. Thus, the tendency of the core to bow outwardly and break the band straps securing the same during annealing is substantially eliminated. It should be noted that during the second pressing operation the two lines of bends at each of the core corners are unbent and a single bend line 163 is formed extending from the core windows partially through the core build where it divides into two bend lines intersecting the outer lamination near the two outer bends. If desired, the horizontal surfaces of block 118 may be inwardly dished so as to overbend core legs 149 on either the first or second pressing operation.

Figure 15B:
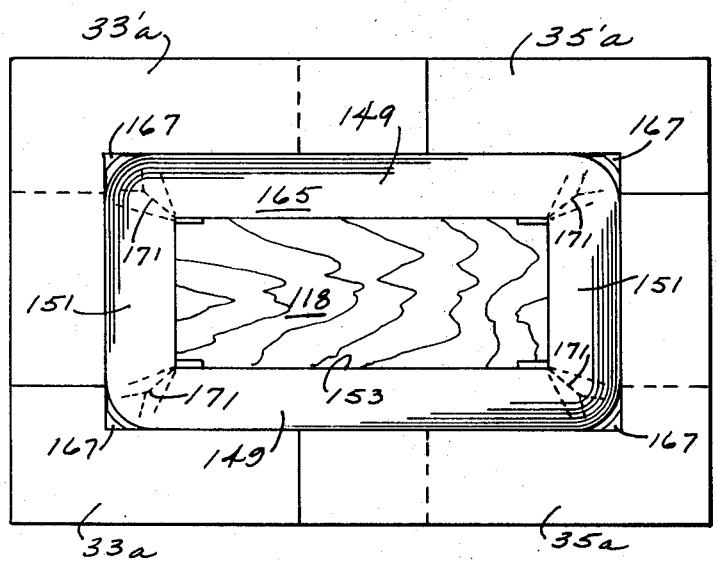
FIGS. 12–15 are diagrammatic views of the die bar assemblies pressing several different types of cores.
Figure 15A:
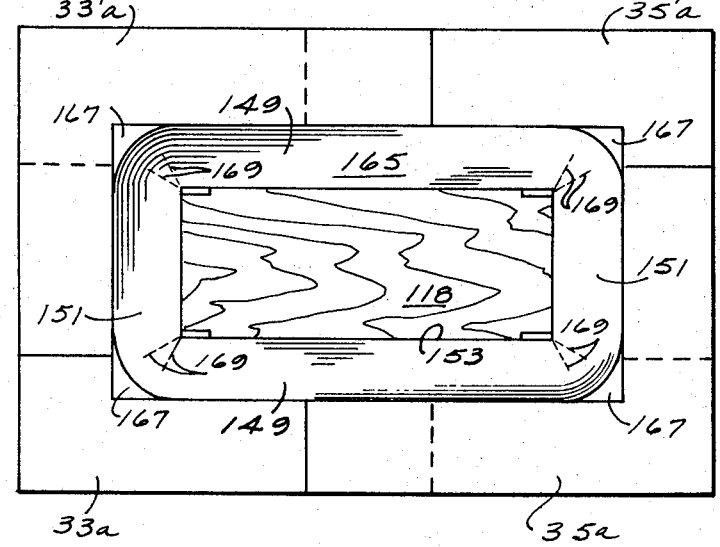

A still further form of the core is indicated at 165 in FIGS. 15A and 15B. This core is produced in a two-step pressing operation by mounting a curved corner block 167 in each of the inner apices of the L bar assemblies for the first pressing, and completely or partially removing block 167 for the second pressing. On the first pressing (FIG. 15A) curved corner blocks 167 produce a pair of bend lines 169 extending from the inner lamination of the core near the corner of the window through a portion of the build but gradually diminishing towards the outer lamination. The blocks 167 are then partially or completely removed and the core is repressed (FIG. 15B). This forces the core laminations outwardly into the corner areas previously occupied in the first pressing by blocks 167, unbends the lines of bend 169 and forms a line of bends 171 extending from the corner of the core window partially through the core build where it divides into a pair of bend lines, the latter terminating short of the outer core lamination. Thus, the outer turn of the core corners is rounded permitting the laminations to slide around the corners during the pressing operation and force the gaps in the core leg 149 closer together. Although lines of bend 171 do not extend completely through the core build, the unbent lines 169 and the partially extending bends 171 are sufficient to restrain the core from bowing outwardly during annealing.

The press and methods of this invention, therefore, are capable of producing a wide variety of core sizes and configurations by merely adjusting the separation between the L bar assemblies and utilizing one of the corner blocks described above in either a one- or two-step pressing operation. Although only four differently configured cores have been illustrated, it should be understood that cores of other configurations may also be formed. Additionally, the cores may be formed with one or more lines of bend in each corner and with overbent yoke portions, the core is automatically centered in and freed from the press prior and subsequent to the pressing operation, and a window block is readily inserted into and removed from the core window.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A press for forming transformer cores having a generally rectangular configuration from wound cores having a generally circular configuration, said press comprising a first platen and a second platen opposed to the first platen, at least one of said platens being movable toward and away from the other in a predetermined direction for compressing a circular core, and means for moving said one platen toward and away from the other in said direction, each platen carrying a first set and a second set of generally L-shaped bars, each of said bars having first and second legs which have core-engaging edges at right angles to one another, the bars in each set being arranged side-by-side and each set being pivotally mounted on its respective platen for rocking movement about an axis extending transversely of the bars of the set and at right angles to said direction of movement with the first legs of the bars of the first set on each platen interdigitating with the first legs of the bars of the respective second set and with the second legs of each of the first and second sets of bars on the first platen being adapted to interdigitate with the second legs of the first and second sets of bars on the second platen as the said one platen is moved toward the other so that, as said one platen moves toward the other to compress a circular core, the first legs of the bars on the first and second platens define two opposite sides of the four sides of a rectangle and the second legs of the bars on the first and second platens define the other two sides of the rectangle.

2. A press as set forth in claim 1 wherein each of said sets of L-shaped bars is positionable with said first legs of the bars extending parallel to the platens and said second legs of the bars extending normal to the platens.

3. A press as set forth in claim 2 wherein each set of L-shaped bars has an inner apex at the juncture of said core-engaging edges of the legs thereof and wherein the opposed platens are parallel and the sets of L-shaped bars are mounted on their respective platens so that their said inner apices define the four corners of a rectangle.

4. A press as set forth in claim 3 wherein the second legs of the first and second sets of L-shaped bars on the first platen are offset along the plane of said platen from the second legs of the first and second sets of L-shaped bars on the second platen.

5. A press as set forth in claim 4 wherein the first legs of the first set of L-shaped bars on each platen are offset along the plane of the respective platen from the first legs of the second set of L-shaped bars on the respective platen.

6. A press as set forth in claim 5 wherein each of the sets of L-shaped bars is mounted on its respective platen for pivotal movement about a respective axis parallel to the platens.

7. A press as set forth in claim 6 further comprising means for pivoting the interdigitated first legs of the L-shaped bars on one of the platens from said position parallel to said platen to a position wherein the ends thereof define a shallow V-shaped recess for cradling a core which is to be compressed in the center of the sets of bars on that platen.

8. A press as set forth in claim 7 wherein said means for moving said one platen toward and away from the other includes a first hydraulic motor and the means for pivoting the interdigitated legs on one of the platens respectively includes a second hydraulic motor.

9. A press as set forth in claim 8 wherein said second motor includes a pressure relief valve, and said first motor exerts a force on said sets of L-shaped bars when pressing a core sufficient to open said valve and permit the first L bar legs to return from their V-shaped recess forming positions to their parallel positions over the platen.

10. A press as set forth in claim 6 further comprising means for moving the first and second sets of L-shaped bars on each platen toward and away from each other.

11. A press as set forth in claim 10 wherein said means for moving said sets of L-shaped bars on each of the platens includes a shaft having oppositely threaded portions received in a pair of internally threaded collars, one of said collars being affixed to each of said sets.

12. A press as set forth in claim 6 further comprising a corner block removably mounted in the inner apieces of each of the sets of L-shaped bars, each of said corner blocks comprising an elongate bar of generally chevron cross-section.

13. A press as set forth in claim 12 wherein each of said corner blocks further comprise a plurality of elongate shims conforming in cross-section to said elongate bar.

14. A press as set forth in claim 13 wherein said elongate bar and shims are configured to form the core with approximately 120° included angles at the apieces of its corners and approximately 165° included angles at the yoke and leg portions adjacent its corners, thereby permanently deforming the core only at the apieces of its corners.

15. A press as set forth in claim 6 further comprising a corner block movably mounted in the inner apieces of each of the sets of L-shaped bars, said corner blocks being movable from a first position extending above the apices in the corners of the rectangular opening to a second position at least partially below the apices and at least partially outside the corners of said opening.

16. A press as set forth in claim 15 wherein said corner blocks each comprise an elongate bar of generally triangular cross-section having a plurality of spaced projections extending from a first surface thereof, said projections being seated on the upper surfaces of the first legs of the L-shaped bars when said corner block is in said first position and being positioned between the first legs of adjacent L-shaped bars when in said second position.

17. A press as set forth in claim 16 wherein each of said corner blocks further comprises a shim slidably mounted on a second surface thereof, and resilient means biasing said shim away from said projections along said second surface.

18. A press as set forth in claim 6 further comprising a window block adapted to be inserted in a center window opening in the core, and means carried by one of said platens for inserting said window block into said opening and removing it therefrom.

19. A press as set forth in claim 18 wherein said means for inserting and removing comprises a hydraulic motor secured to said platen, said motor having a piston rod adapted for transverse movement between said sets of L-shaped bars.

References Cited

UNITED STATES PATENTS

| | | | |
|---|---|---|---|
| 159,378 | 2/1875 | Baldwin | 100—295 |
| 687,092 | 11/1901 | Webb | 100—295 |
| 3,220,239 | 11/1965 | Olsen et al. | 72—398 |

CHARLES W. LANHAM, Primary Examiner

M. J. KEENAN, Assistant Examiner

U.S. Cl. X.R.

72—398, 401; 100—296

PO-1050
(5/69)

UNITED STATES PATENT OFFICE
CERTIFICATE OF CORRECTION

Patent No. 3,535,907　　　　　　　Dated October 27, 1970

Inventor(s) David F. Winter

It is certified that error appears in the above-identified patent and that said Letters Patent are hereby corrected as shown below:

Column 1, line 6, "corporation of Arkansas" should read -- corporation of Delaware --.

Signed and sealed this 23rd day of March 1971.

(SEAL)
Attest:

EDWARD M. FLETCHER, JR.　　　　　　　WILLIAM E. SCHUYLER, JR.
Attesting Officer　　　　　　　　　　Commissioner of Patents